(12) United States Patent
Pavlovsky et al.

(10) Patent No.: US 10,727,697 B2
(45) Date of Patent: Jul. 28, 2020

(54) POWER FLOW CONTROLLER SYNCHRONIZATION

(71) Applicant: WiTricity Corporation, Watertown, MA (US)

(72) Inventors: Martin Pavlovsky, Munich (DE); Felix Weidner, Munich (DE); Nicholas Athol Keeling, Munich (DE)

(73) Assignee: WiTricity Corporation, Watertown, MA (US)

( * ) Notice: Subject to any disclaimer, the term of this patent is extended or adjusted under 35 U.S.C. 154(b) by 517 days.

(21) Appl. No.: 15/453,977

(22) Filed: Mar. 9, 2017

(65) Prior Publication Data

US 2018/0076667 A1 Mar. 15, 2018

Related U.S. Application Data

(60) Provisional application No. 62/394,392, filed on Sep. 14, 2016.

(51) Int. Cl.
| | |
|---|---|
| *H02J 50/12* | (2016.01) |
| *H02J 50/90* | (2016.01) |
| *H02J 7/02* | (2016.01) |
| *H02M 3/335* | (2006.01) |
| *H02M 3/158* | (2006.01) |
| *B60L 53/12* | (2019.01) |

(Continued)

(52) U.S. Cl.
CPC .............. *H02J 50/12* (2016.02); *B60L 53/12* (2019.02); *H02J 7/025* (2013.01); *H02J 50/90* (2016.02); *H02M 3/158* (2013.01); *H02M 3/335* (2013.01); *H02M 7/217* (2013.01); *H02M 2001/007* (2013.01); *H02M 2001/0058* (2013.01); *Y02B 70/1491* (2013.01)

(58) Field of Classification Search
CPC ............ H02J 50/12; H02J 50/90; H02J 7/025; H02M 7/217; H02M 2001/0058; H02M 2001/007; H02M 3/158; H02M 3/335; B60L 53/12; Y02B 70/1491
See application file for complete search history.

(56) References Cited

U.S. PATENT DOCUMENTS

| | | | | |
|---|---|---|---|---|
| 5,181,159 A | * | 1/1993 | Peterson | ............. H02M 1/4225 323/222 |
| 6,535,407 B1 | * | 3/2003 | Zaitsu | ............... H02M 3/33569 363/126 |
| 6,597,587 B1 | | 7/2003 | Poon et al. | |

(Continued)

OTHER PUBLICATIONS

International Search Report and Written Opinion—PCT/US2017/047274—ISA/EPO—dated Nov. 28, 2017.

*Primary Examiner* — Jared Fureman
*Assistant Examiner* — Michael J Warmflash
(74) *Attorney, Agent, or Firm* — Hunter Clark PLLC

(57) ABSTRACT

Techniques for wireless power transfer are disclosed. An example of an apparatus for receiving power in a wireless power transfer system includes a power receiving element, a tuning and current doubler circuit operably coupled to the power receiving element, a power flow controller circuit operably coupled to the tuning and current doubler circuit, and a controller operable coupled to the power receiving element and the power flow controller circuit and configured to detect a signal in the power receiving element and to synchronize the power flow controller circuit based on the signal.

27 Claims, 13 Drawing Sheets

(51) Int. Cl.
*H02M 7/217* (2006.01)
*H02M 1/00* (2006.01)

(56) References Cited

U.S. PATENT DOCUMENTS

| | | | |
|---|---|---|---|
| 9,859,797 B1 * | 1/2018 | Leabman | H02M 7/217 |
| 2010/0220501 A1 | 9/2010 | Krause | |
| 2011/0254377 A1 | 10/2011 | Wildmer et al. | |
| 2014/0054970 A1 * | 2/2014 | Keeling | H04B 5/0037 |
| | | | 307/104 |
| 2015/0015072 A1 | 1/2015 | Deboy et al. | |
| 2015/0229225 A1 | 8/2015 | Jang et al. | |
| 2016/0250932 A1 * | 9/2016 | Keeling | H02J 7/00 |
| | | | 320/108 |
| 2017/0033607 A1 * | 2/2017 | Boys | H02M 7/06 |

\* cited by examiner

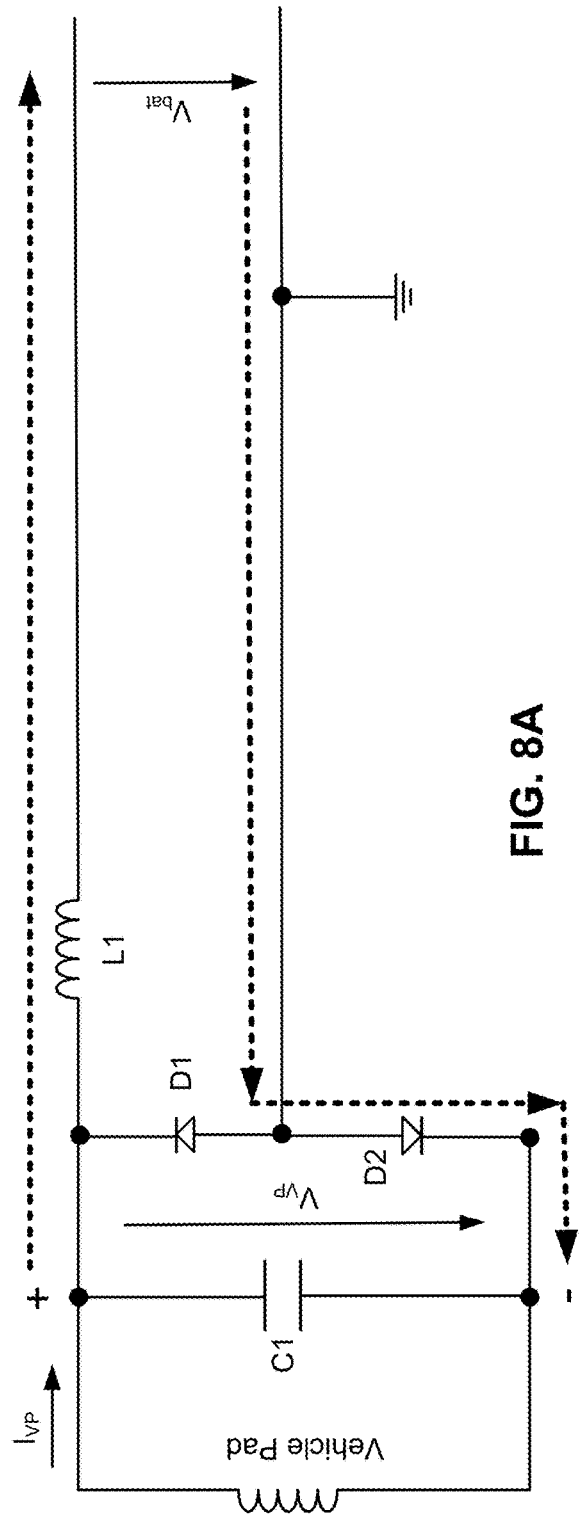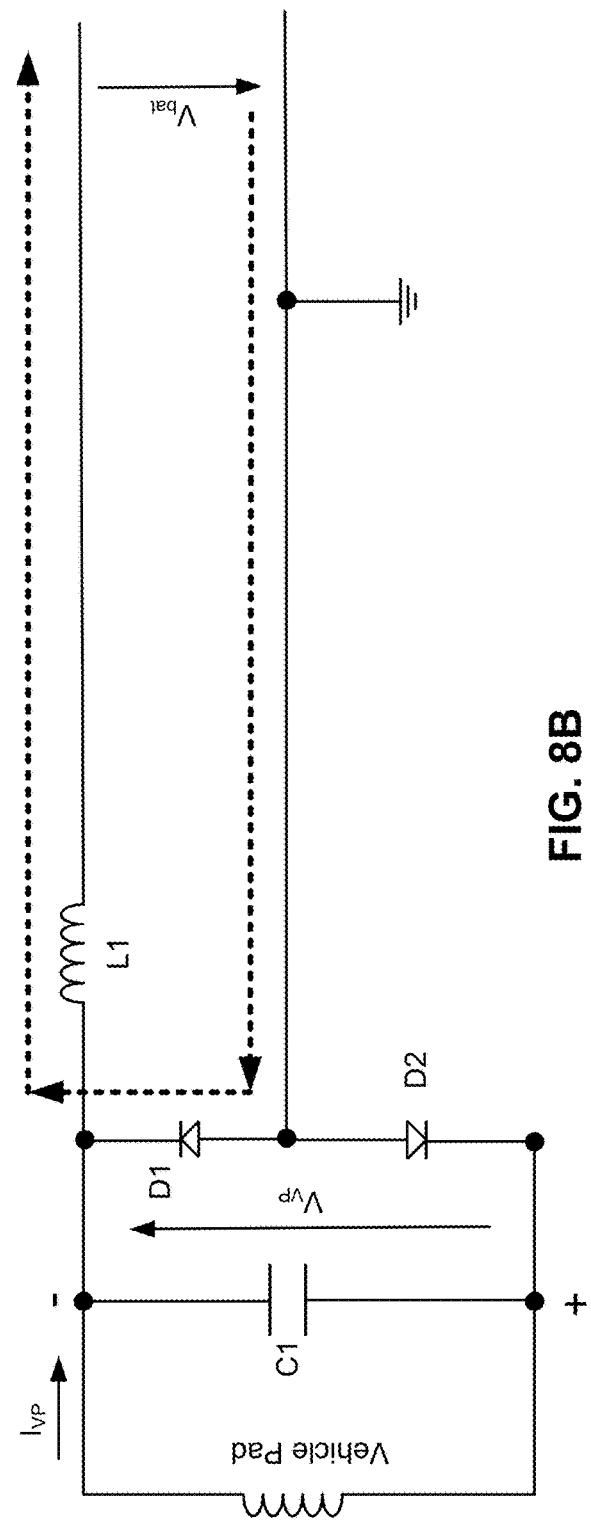
FIG. 8A
FIG. 8B

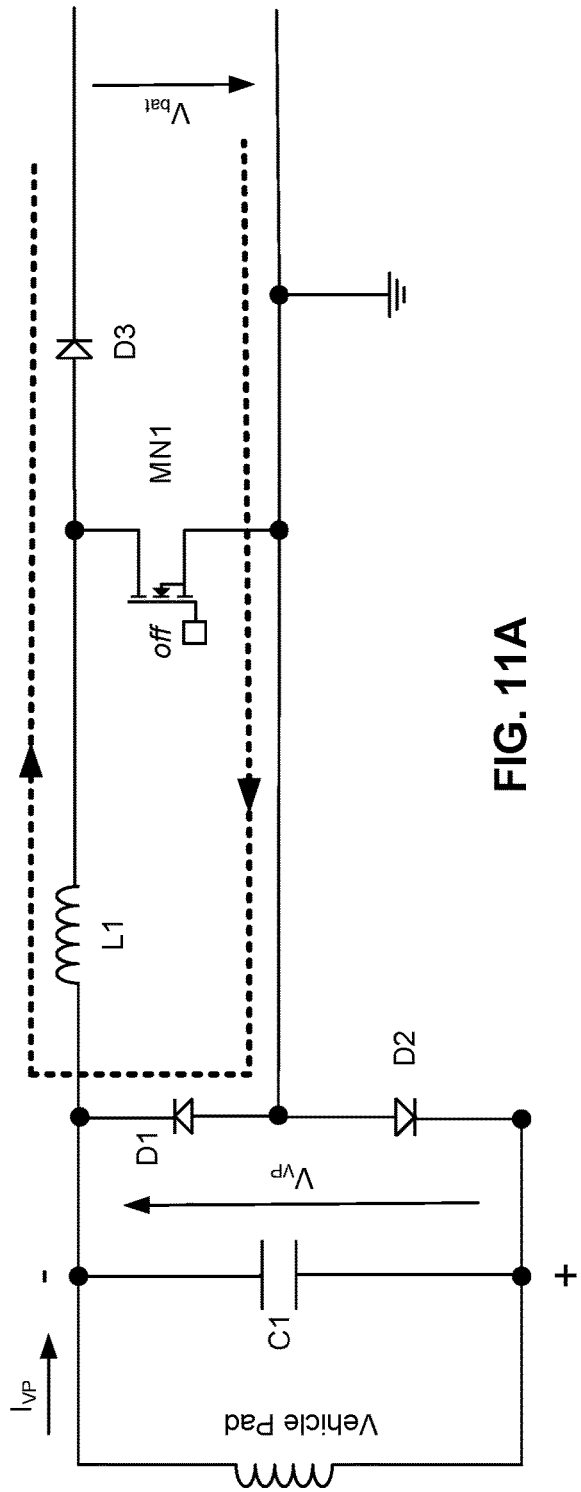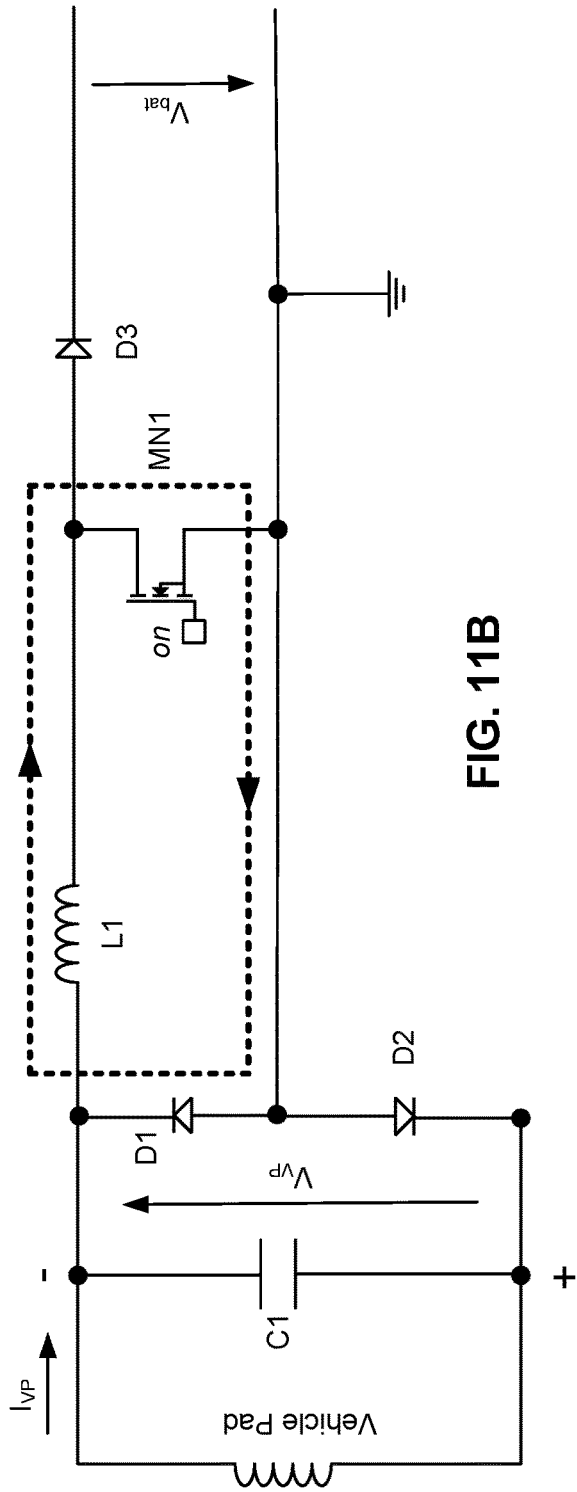
FIG. 11A
FIG. 11B

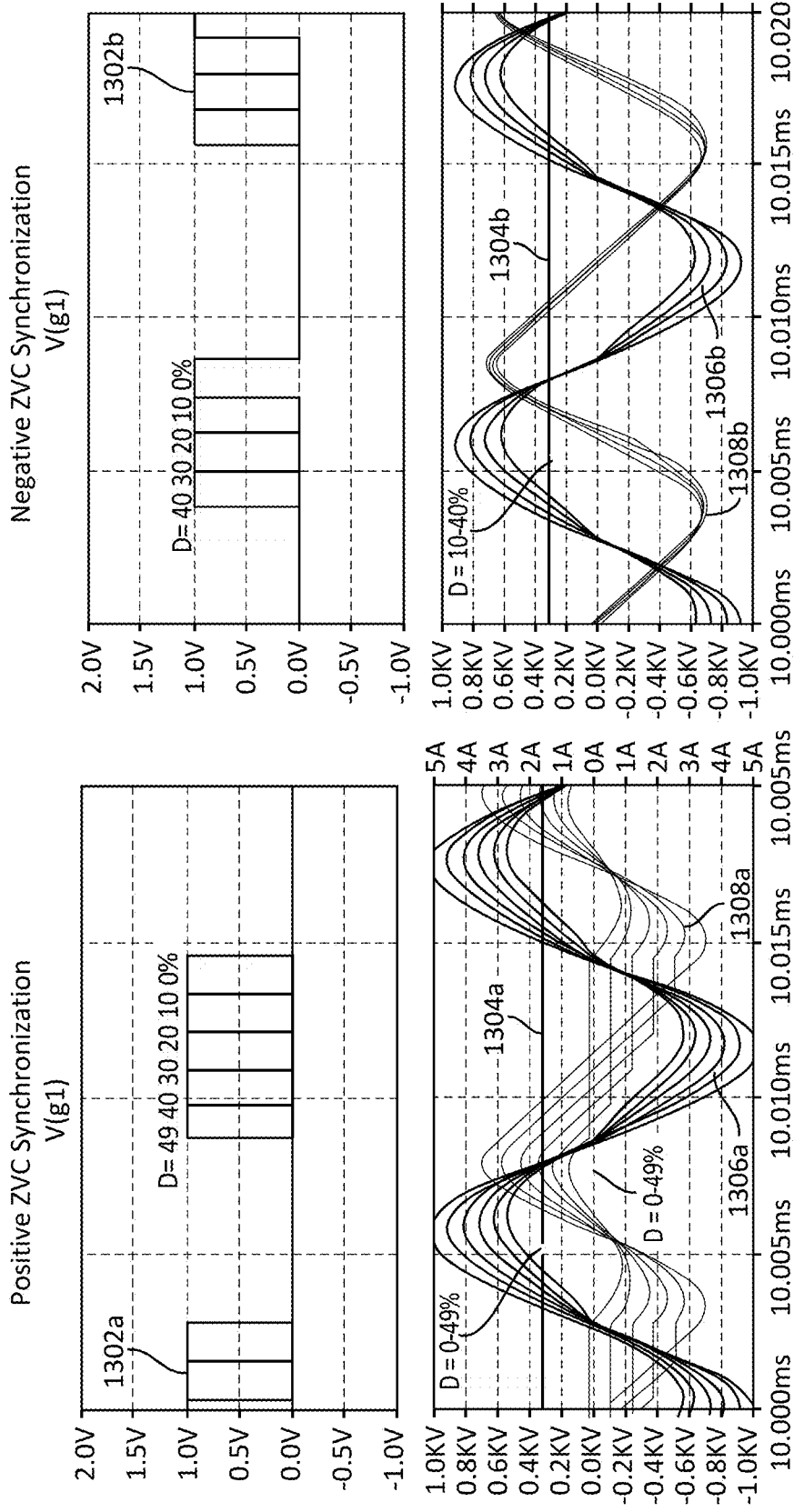

POWER FLOW CONTROLLER SYNCHRONIZATION

CROSS-REFERENCE TO RELATED APPLICATIONS

This application claims the benefit of U.S. Provisional Application No. 62/394,392 filed Sep. 14, 2016, entitled "POWER FLOW CONTROLLER SYNCHRONIZATION," the entire contents of which is hereby incorporated herein by reference.

FIELD

This application is generally related to wireless power charging of chargeable devices, and more particularly for synchronization of a power flow controller with a receiver voltage signal.

BACKGROUND

A variety of electrical and electronic devices are powered via rechargeable batteries. Such devices include electric vehicles, mobile phones, portable music players, laptop computers, tablet computers, computer peripheral devices, communication devices (e.g., Bluetooth devices), digital cameras, hearing aids, and the like. Historically, rechargeable devices have been charged via wired connections through cables or other similar connectors that are physically connected to a power supply. More recently, wireless charging systems are being used to transfer power in free space to be used to charge rechargeable electronic devices or provide power to electronic devices. The transfer of power in free space may be dependent on the orientation of a transmitting and receiving units. Changes in the relative position and/or resonant frequencies of the transmitting and receiving units during charging operations can create stress on the circuit components. These potential variations in operating parameters often mean that a circuit must be over designed to ensure the components are robust enough to accommodate the changes. Such overly robust designs can increase the unit cost, and may have other undesired performance characteristics. Wireless power transfer systems and methods that allow for more cost effect designs to control and safely transfer power to electronic devices in such dynamic environments are desirable.

SUMMARY

An example of an apparatus for receiving power in a wireless power transfer system according to the disclosure includes a power receiving element, a tuning and current doubler circuit operably coupled to the power receiving element, a power flow controller circuit operably coupled to the tuning and current doubler circuit, and a controller operable coupled to the power receiving element and the power flow controller circuit and configured to detect a signal in the power receiving element and to synchronize the power flow controller circuit based on the signal.

Implementations of such an apparatus may include one or more of the following features. The controller may be configured to synchronize the frequency of the power flow controller based on a negative zero crossover point in the signal. The controller may be configured to synchronize the frequency of the power flow controller based on a positive zero crossover point in the signal. A power output may be operably coupled to the power flow controller circuit. The power output may be a battery. The signal in the power receiving element may be a voltage signal in the power receiving element. The frequency of the voltage signal may be in the range of 80 to 90 kHz. The tuning and current double circuit may include at least one capacitor, at least two diodes, and at least two inductors. The power flow controller circuit may include at least one switch operably coupled to the controller, wherein synchronizing the power flow controller includes activating the at least one switch based on the signal. The controller may be configured to determine a duty cycle of the power flow controller. The controller may be configured to determine the duty cycle based on a power receiving element inductance value. The signal may be a current signal in the power receiving element. The power receiving element may receive power via an inductive coupling with a transmitter.

An example of a method of controlling a receiver in a wireless power transfer system according to the disclosure includes detecting a signal in a power receiving element, such that the signal is at an operating frequency, determining a synchronization point in the signal, and activating a power flow controller based on the synchronization point and the operating frequency.

Implementations of such a method may include one or more of the following features. Determining the synchronization point may include determining a negative zero voltage crossing point in the signal. Determining the synchronization point may include determining a positive zero voltage crossing point in the signal. The method may include determining a power receiving element inductance value, determining a power flow controller duty cycle based on the power receiving element inductance value, and activating the power flow controller based at least in part on the power flow controller duty cycle. Activating the power flow controller includes controlling a drain to source voltage in one or more transistors based on the synchronization point and the operating frequency. The method may further include determining an electrical current output to a battery, such that the battery is operably coupled to the power flow controller via an output filter, determining a power flow controller duty cycle based on the electrical current output, and activating the power flow controller based at least in part on the power flow controller duty cycle. The power flow controller duty cycle may be between 0% and 50%. The signal detected in the power receiving element may be a voltage or current signal.

An example of a non-transitory processor-readable storage medium comprising instructions for controlling a receiver in a wireless power transfer system according to the disclosure includes code for detecting a signal in a power receiving element, wherein the signal is at an operating frequency, code for determining a synchronization point in the signal, and code for activating a power flow controller based on the synchronization point and the operating frequency.

Implementations of such a non-transitory processor-readable storage medium may include one or more of the following features. The code for determining the synchronization point may include code for determining a negative zero voltage crossing point in the signal. The code for determining the synchronization point may include code for determining a positive zero voltage crossing point in the signal. The non-transitory processor-readable storage medium may include code for determining a power receiving element inductance value, code for determining a power flow controller duty cycle based on the power receiving element inductance value, and code for activating the power flow controller based at least in part on the power flow controller duty cycle. The code for activating the power flow controller may include code for controlling a drain to source voltage in one or more transistors based on the synchronization point and the operating frequency. The non-transitory processor-readable storage medium may include code for determining an electrical current output to a battery, such that the battery is operably coupled to the power flow controller via an output filter, code for determining a power flow controller duty cycle based on the electrical current output, and code for activating the power flow controller based at least in part on the power flow controller duty cycle. The power flow controller duty cycle may be between 0% and 50%. The signal may be a voltage or current signal.

An example of an apparatus for receiving power in a wireless power transfer system according to the disclosure includes a power receiving means, a tuning and current doubler means operably coupled to the power receiving means, a power flow controller means operably coupled to the tuning and current doubler means, and a controller means operable coupled to the power receiving means and the power flow controller means and configured to detect a signal in the power receiving means and to synchronize the power flow controller means based on the signal. The signal may be a voltage or current signal.

Items and/or techniques described herein may provide one or more of the following capabilities, as well as other capabilities not mentioned. A wireless power transfer receiving unit may be positioned in proximity to a transmitting unit. A voltage signal or current signal may be detected in the receiving unit. The frequency of the transmitting unit may be detected at the receiving unit. A synchronization point may be selected (e.g., positive zero voltage crossover, negative zero crossover voltage, or other points). A power flow controller (e.g., a switch mode controller) in the receiver may be synchronized to the transmitter frequency based on the synchronization point. Ripple current caused by inductors in the receiver may be reduced based on the power flow controller's duty cycle. The operational stability of the receiver may be increased. A smaller more efficient current doubler may be used in the receiver. Stress on the transmitter components may be reduced. Changing the duty cycle of the power flow controller can change the ripple current. The ripple current may indicate the amount of power being injected into the resonant tank circuit in the receiver. Changing the synchronization point may be used to for tuning the receiver. Changing the duty cycle may be used to adjust for inductance variation caused by variations in base pad alignment. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

FIGS. 8A and 8B are examples of current flow through the circuit of FIG. 7A.

FIGS. 11A and 11B are simplified schematic diagrams of a circuit with positive zero voltage crossover point synchronization.

FIG. 13A is a graph of simulated waveforms for positive zero voltage crossover point synchronization.

FIG. 13B is a graph of simulated waveforms for negative zero voltage crossover point synchronization.

DETAILED DESCRIPTION

Figure 1:
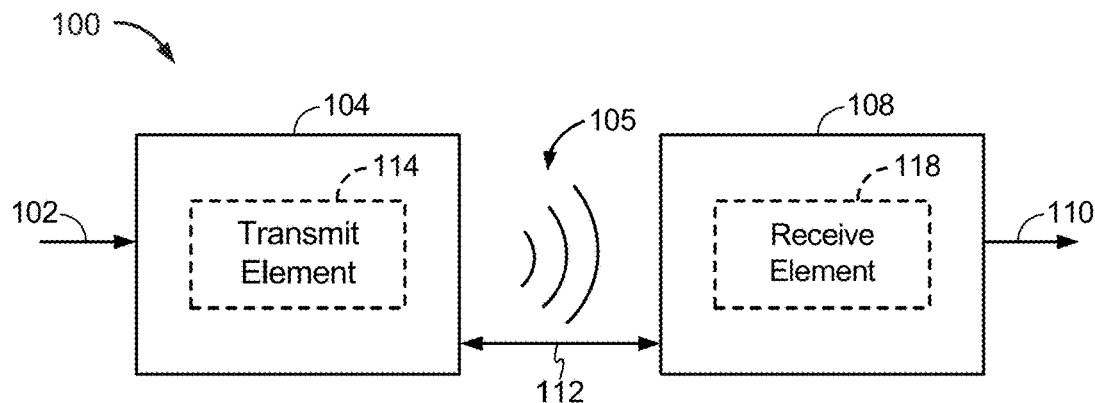
FIG. 1 is a functional block diagram of an exemplary wireless power transfer system.

Techniques are discussed herein for wireless power transfer using resonant circuits. Wireless power transfer may refer to transferring any form of energy associated with electric fields, magnetic fields, electromagnetic fields, or otherwise from a transmitter to a receiver without physical electrical conductors attached to and connecting the transmitter to the receiver to deliver the power (e.g., power may be transferred through free space). The power output into a wireless field (e.g., a magnetic field or an electromagnetic field) may be received, captured by, or coupled to by a power receiving element to achieve power transfer. The transmitter transfers power to the receiver through a wireless coupling of the transmitter and receiver. In an example, the transmitter and receiver are used in a Wireless Electric Vehicle Charging (WEVC) system. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like)."

A wireless power transfer system may be required to handle variations of several operating parameters during charging operations. In a parallel tuned circuit with a passive secondary side receiver, the operating parameter variations are generally handled by the base side inverter (i.e., the transmitter). The passive electronics in the transmitter may also be affected by battery voltage variation which may cause additional losses in the receiving coil. These parametric changes may add more variation that the transmitter must handle, which may increase the stress on the transmitter components (e.g., inverter). In some operating points, the unfavorable combination of operating parameters may place considerable stress on the inverter components and significantly reduce the system efficiency.

A receiver with power flow controller synchronization may be used to reduce the variation of the operating parameters by fixing the battery voltage variation as seen by the receiver. Power flow controller synchronization may eliminate the need for a partial series circuit in the receiver and the corresponding detuning effects may be reduced. In general, power flow controller synchronization may increase the efficiency of a wireless power transfer system overall average by allowing the transmitter inverter to operate under more favorable (e.g., less stressful) conditions.

FIG. 1 is a functional block diagram of an example of a wireless power transfer system 100. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) that is coupled to receive the output power 110. The transmitter 104 and the receiver 108 are separated by a non-zero distance 112. The transmitter 104 includes a power transmitting element 114 configured to transmit/couple energy to the receiver 108. The receiver 108 includes a power receiving element 118 configured to receive or capture/couple energy transmitted from the transmitter 104.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that up to about one wavelength, of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
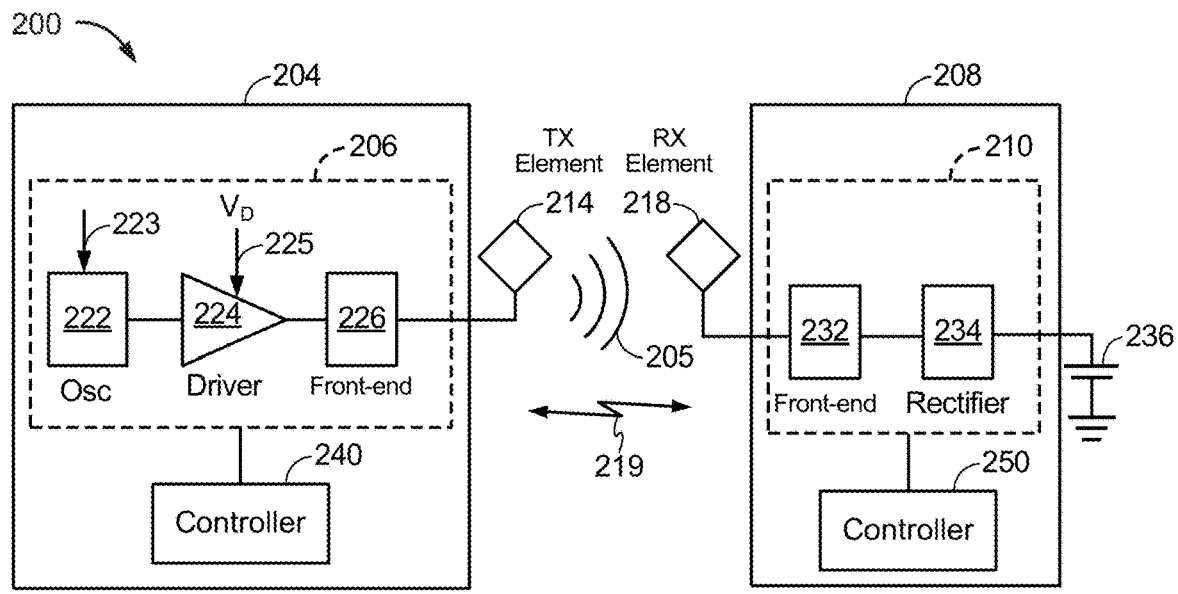
FIG. 2 is a functional block diagram of an example of another wireless power transfer system.

FIG. 2 is a functional block diagram of an example of a wireless power transfer system 200. The system 200 includes a transmitter 204 and a receiver 208. The transmitter 204 is configured to provide power to a power transmitting element 214 that is configured to transmit power wirelessly to a power receiving element 218 that is configured to receive power from the power transmitting element 214 and to provide power to the receiver 208. Despite their names, the power transmitting element 214 and the power transmitting element 218, being passive elements, may transmit and receive power and communications.

The transmitter 204 includes the power transmitting element 214, transmit circuitry 206 that includes an oscillator 222, a driver circuit 224, and a front-end circuit 226. The power transmitting element 214 is shown outside the transmitter 204 to facilitate illustration of wireless power transfer using the power transmitting element 218. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
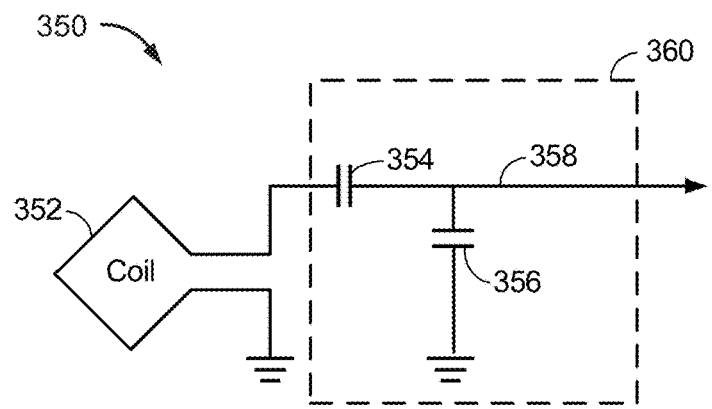
FIG. 3 is a schematic diagram of a portion of transmit circuitry or receive circuitry of FIG. 2 including a transmit or receive element.

The receiver 208 includes the power receiving element 218, and receive circuitry 210 that includes a front-end circuit 232 and a rectifier circuit 234. The power receiving element 218 is shown outside the receiver 208 to facilitate illustration of wireless power transfer using the power receiving element 218. The front-end circuit 232 may include matching circuitry configured to match the impedance of the receive circuitry 210 to the impedance of the power receiving element 218. As will be explained below, the front-end circuit 232 may further include a tuning circuit and a current doubler to create a resonant circuit with the power receiving element 218. The rectifier circuit 234 may generate a DC power output from an AC power input to charge the battery 236, as shown in FIG. 3. The rectifier circuit 234 may include an interleaved power flow controller (e.g., switch mode controller) with one or more semiconductor switches configured to control the power to the battery 236. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to the wireless field 205 and generate an output power for storing or consumption by a battery (or load) 236 coupled to the output or receive circuitry 210. In this example, the generated output power is associated with the resonant circuit in the front end 232 because the tuning of the resonant circuit will impact the amount of output power generated.

The receiver 208 further includes a controller 250 that may be configured similarly to the transmit controller 240 as described above for managing one or more aspects of the wireless power receiver 208. The receiver 208 may further include a memory (not shown) configured to store data, such as instructions for causing the controller 250 to perform particular functions, such as those related to management of wireless power transfer.

As discussed above, transmitter 204 and receiver 208 may be separated by a distance and may be configured according to a mutual resonant relationship to try to minimize transmission losses between the transmitter 204 and the receiver 208.

FIG. 3 is a schematic diagram of an example of a portion of the transmit circuitry 206 or the receive circuitry 210 of FIG. 2. While a coil, and thus an inductive system, is shown in FIG. 3, other types of systems, such as capacitive systems for coupling power, may be used, with the coil replaced with an appropriate power transfer (e.g., transmit and/or receive) element. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
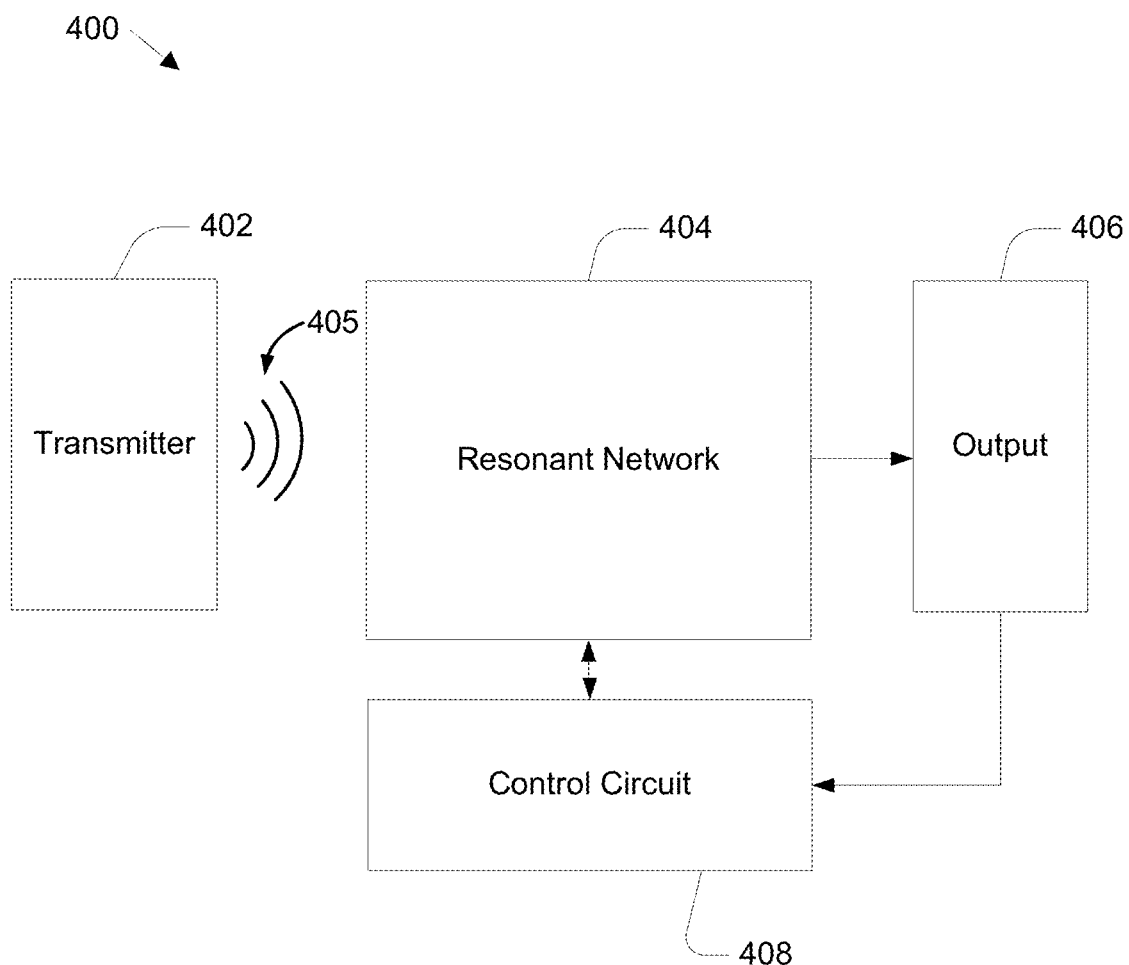
FIG. 4 is a diagram of an exemplary wireless power transfer system with a control loop on the receive circuitry.

Referring to FIG. 4, a diagram of an exemplary wireless power transfer system 400 with a control loop on the receive circuitry is shown. The system 400 includes a transmitter 402 and resonant network 404 with a control circuit 408. The transmitter 402 is configured to output a time-varying field 405 (e.g., magnetic or electromagnetic) such as described for the transmit element 214. The resonant network 404 is configured to provide an output 406. The resonant network 404 may be part of the front end 232 and the output 406 may receive an AC signal which is associated with the tuning of the resonant network 404. The output 406 may be, for example, further rectified for use in power applications (e.g., battery charging), or used in impedance matching devices (e.g., antenna matching in a communication system). A control circuit 408 may be part of the controller 250 and is operably coupled to the output 406 and the resonant network 404. The resonant network 404 comprises a resonant circuit with one or more reactive elements and a current doubler. In a charging configuration, the resonant network may include an interleaved power flow controller with one or more switching semiconductors (e.g., transistors). The control circuit 408 may be configured to change the duty cycle of the power flow controller based on a voltage/current at the output 406. The control circuit 408 may be operably coupled to the power flow controller and configured to change the state of the transistors (e.g., the duty cycle). For example, the control circuit 408 may detect feedback parameter on the output 406 (e.g., a current, a voltage, a standing wave ratio, or other parameter), generate a control signal based on the feedback signal, and provide the control signal to the power flow controller (or other related elements) to change power provide to the output 406.

Figure 5:
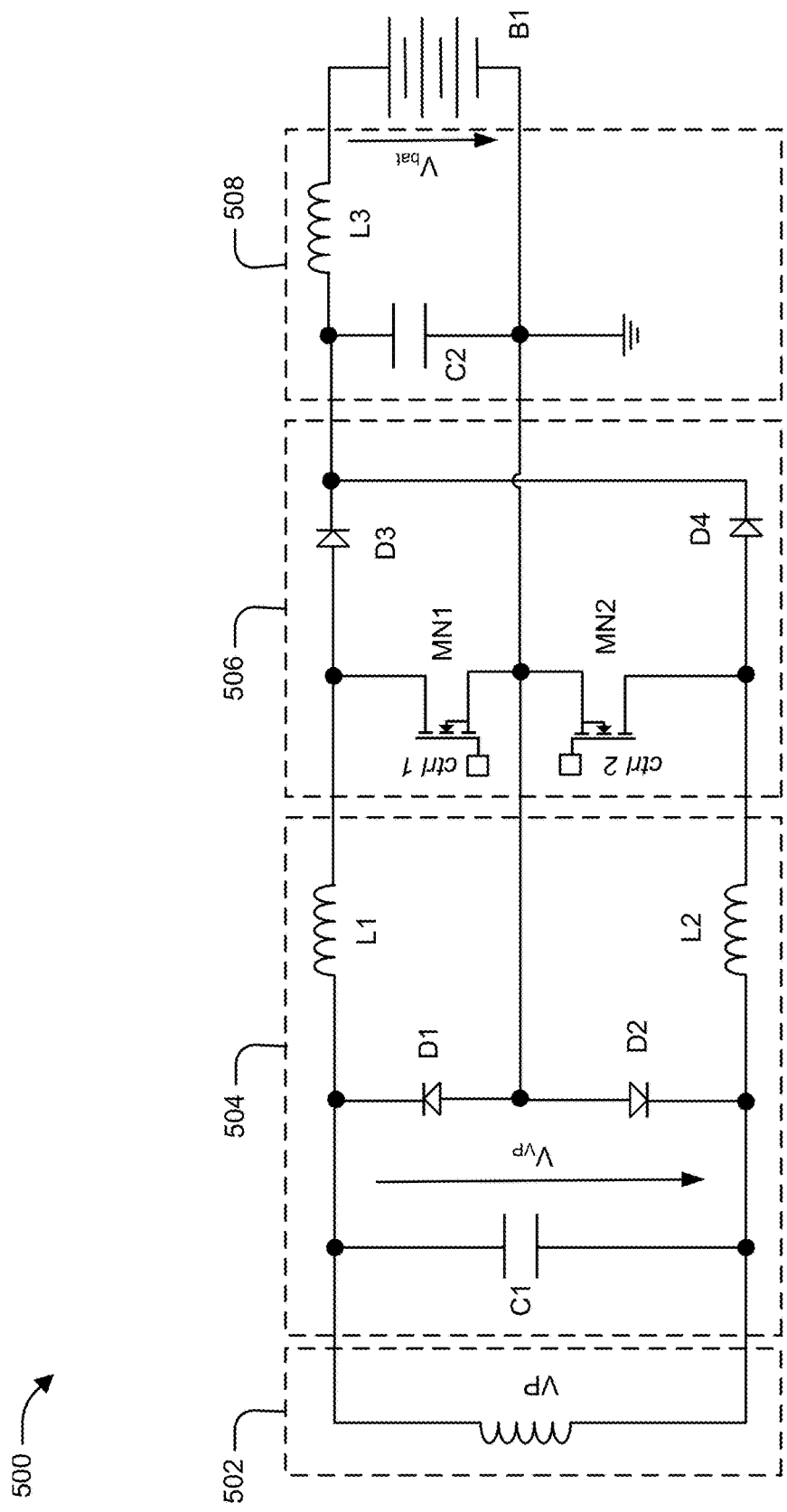
FIG. 5 is a schematic diagram of an example receiver in a wireless power transfer system.

Referring to FIG. 5, a schematic diagram of an example receiver 500 in a wireless power transfer system is shown. In an effort to more efficiently explain aspects of power flow controller synchronization, the example receiver 500 is directed to wireless electric vehicle charging (WEVC). For example, the receiver 500 may be or be part of a vehicle pad (e.g., secondary side unit) that is integrated on a vehicle for wirelessly receiving power from a transmitter that may be a base pad (e.g., primary side unit) that is on or buried on a driving surface. Power flow controller synchronization may also be used in other applications and devices such as mobile phones, portable music players, laptop computers, tablet computers, computer peripheral devices, communication devices (e.g., Bluetooth devices), digital cameras, hearing aids, and the like. The receiver 500 illustrates the four main stages of an inductive power transfer system secondary side including a vehicle pad circuit 502, a tuning and current doubler circuit 504, an interleaved power flow controller (boost) stage 506 and an output filter 508. The vehicle pad circuit 502 includes a vehicle pad coil VP. The tuning and current doubler circuit 504 includes a parallel tuning capacitor C1, a first diode D1, a second diode D2, a first inductor L1, and a second inductor L2. The interleaved power flow controller stage 506 may be part of a switch mode controller and includes a first transistor device MN1, a second transistor device MN2, a third diode D3, and a fourth diode D4. In an example, the first and second transistors MN1, MN2 are metal-oxide-semiconductor field-effect transistors (MOSFETs) configured to be independently opened or closed via a respective control signal (e.g., ctrl 1, ctrl 2). The use of MOSFET devices is exemplary only and not a limitation as other switching structures may be used. The output filter 508 includes a filter capacitor C3 and a filter inductor L3. The receiver 500 may be operably coupled to a battery B1. The specifications of the components in the receiver 500 will vary based on application and expected power levels. In a vehicle charging application, the voltage across with vehicle pad ($V_{VP}$) may be in the range from 500-800V. The first and second diodes D1, D2 may be rated for 1200V, the third and fourth diodes D3, D4 may be rated for 650V, and the MOSFETs MN1, MN2 may be rated to 650V. The output $V_{bat}$ may be in the range of 300-400V.

Figure 6:
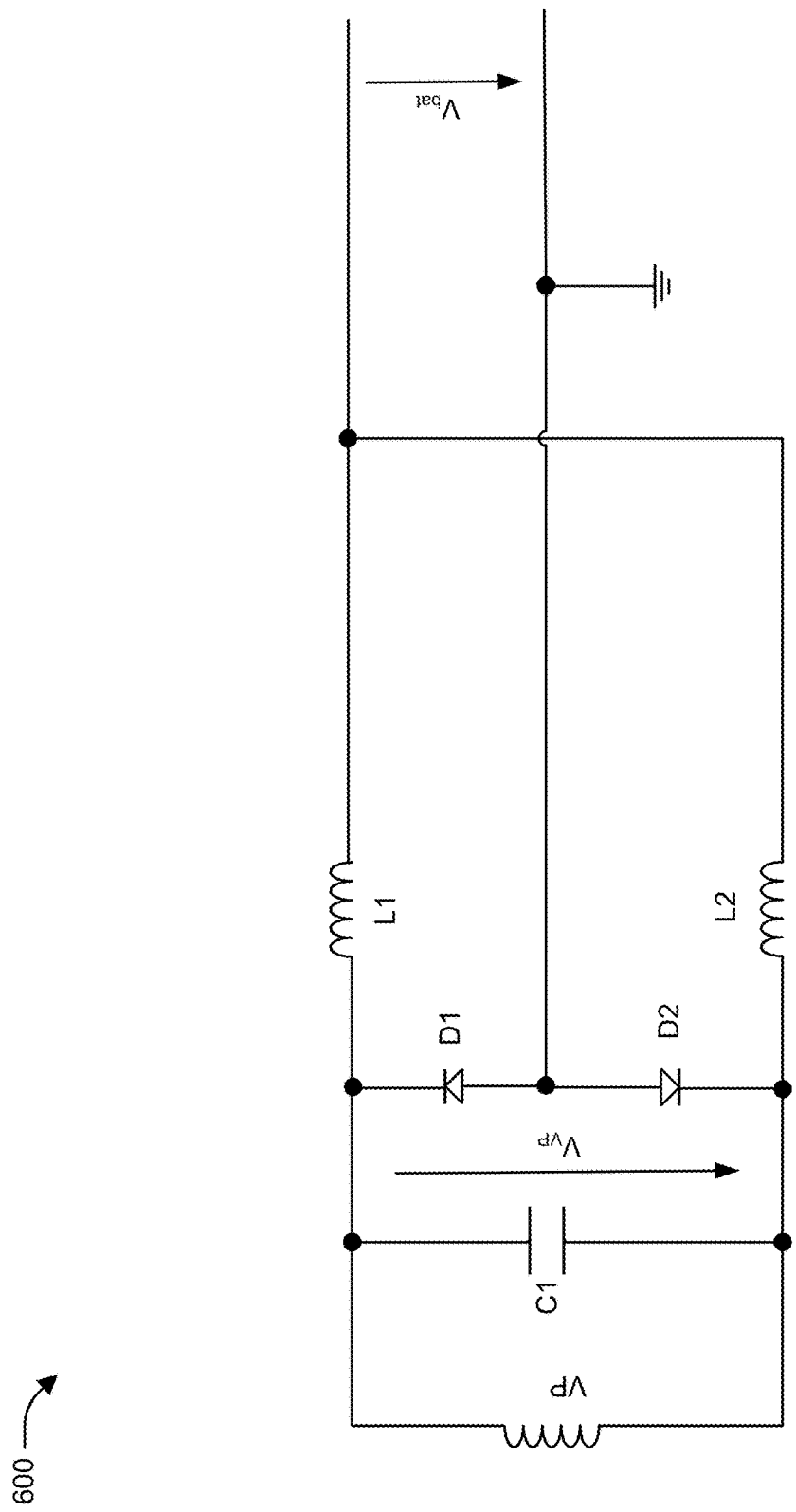
FIG. 6 is a simplified schematic diagram of an example current doubler stage.

Referring to FIG. 6, with further reference to FIG. 5, a schematic of an example current doubler stage 600 is shown. The current doubler stage 600 is a simplified version of the receiver 500 (i.e., without the interleaved power flow controller stage 506 and the output filter 508). The current doubler stage 600 is provided to facilitate the explanation of a current doubler. The current doubler stage 600 may be further simplified to include only one inductor L1, as shown in FIG. 7A.

Figure 7A:
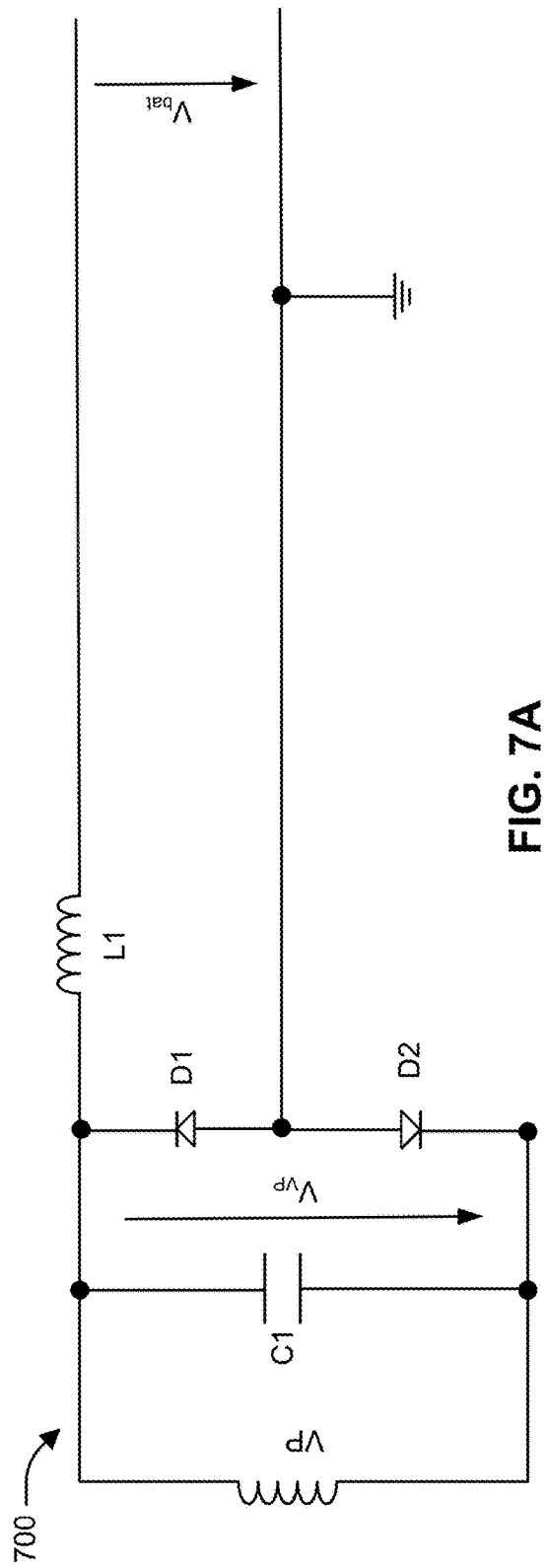
FIG. 7A is a simplified schematic diagram of an example circuit with only one inductor.
Figure 7B:
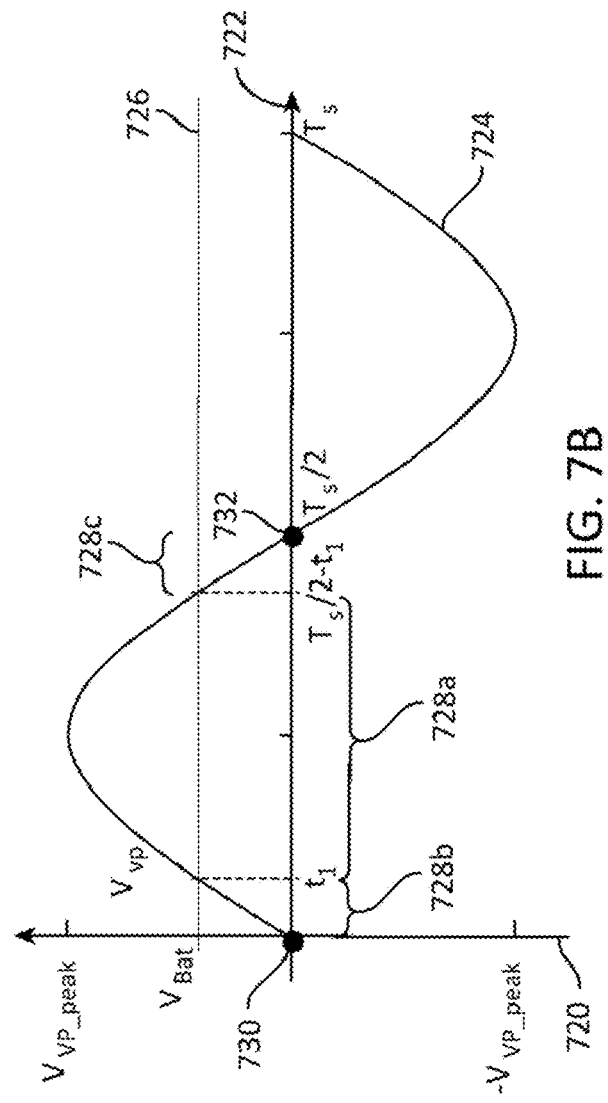
FIG. 7B is a graph of voltage in a vehicle pad.

Referring to FIG. 7A, schematic diagram of an example of a circuit 700 with only one inductor is shown. The description herein for the circuit 700 is equally valid for the current doubler stage 600 (e.g., including two inductors L1, L2), with the difference that there is reversed polarity of the VP voltage. The output current flowing into the battery B1 is a sum of the two inductor currents (e.g., $I_{L1}$, $I_{L2}$) which is the reason why this section of the receiver 500 is called a "current doubler" topology. Referring to FIG. 7B, a graph of voltage in a vehicle pad (VP) is shown. The graph includes a voltage axis 720, a time (t) axis 722, and a VP voltage value 724. The graph also includes a battery voltage ($V_{Bat}$) line 726, a positive zero voltage crossing (ZVC) point 730, and a negative ZVC point 732. The operating period from T=0 to T=$T_s$/2 is split into three intervals. During a first interval 728a the VP voltage is larger than the battery voltage ($V_{Bat} < V_{VP}$). During a second interval 728b and a third interval 728c the battery voltage is larger than the VP voltage ($V_{Bat} > V_{VP}$). During the first interval 728a, the resonant tank (e.g., the inductor VP and capacitor C1) serves as the energy source. The inductor L1 is exposed to the difference between the VP voltage (positive half period) and the battery voltage ($V_{VP} - V_{Bat}$). The energy is stored in the inductor L1 (i.e., current in the inductor increases). During the second interval (e.g., $V_{Bat} > V_{VP}$), the inductor L1 uses its stored energy and serves as the energy source. The voltage across the inductor L1 is equal to $-V_{Bat}$.

Figure 9:
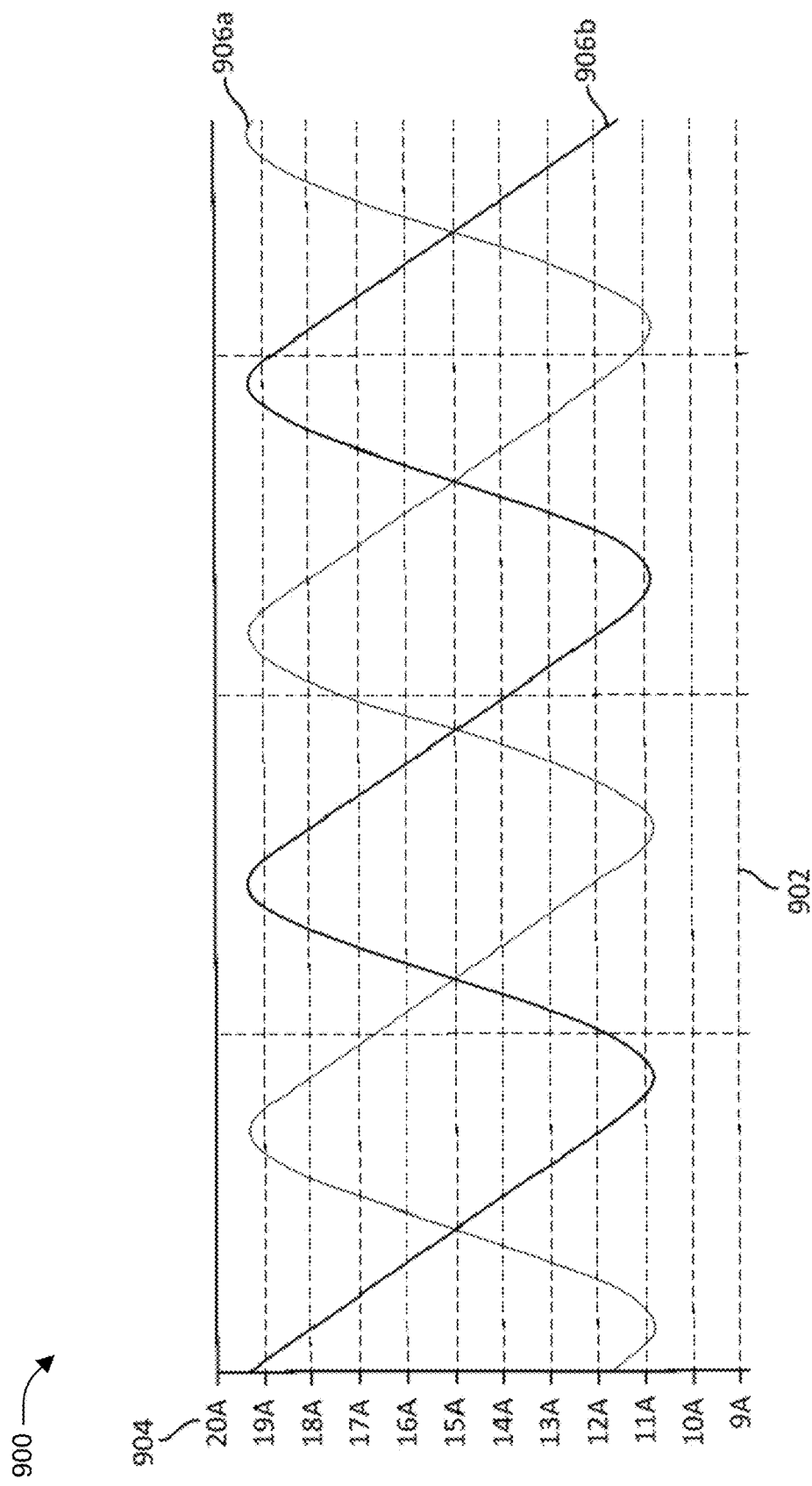
FIG. 9 is a graph of current ripple in DC inductors.

Referring to FIGS. 8A and 8B, with further reference to FIG. 5, examples of current flow through the circuit 700 are shown. FIG. 8A shows the current flow through the circuit 700 for $V_{VP} > 0$ (i.e., 0<t<Ts/2). FIG. 8B shows the current flow through the circuit 700 for $V_{VP} < 0$ (i.e., Ts/2<t<Ts). During the interval when $V_{VP} > 0$ (i.e., 0<t<Ts/2), the inductor stores as well as supplies the energy. FIGS. 8A and 8B show that the full battery current crosses one of the first or second diodes D1, D2, but only during one half of the period. If the third and fourth diodes D3, D4 are installed (e.g., the full circuit as shown in FIG. 5 without switching), one half of the battery current would cross during the entire operating period. In case the current doubler stage 600, as shown in FIG. 6, the inductors L1, L2 should have similar values to maintain the symmetry of the circuit. As long as the inductor values are not infinitely large, they also carry an AC ripple current, in addition to the DC load current, due to being charged and discharged with energy. An example of the inductor AC ripple currents is shown in FIG. 9. The graph of current ripple in DC inductors in FIG. 9 includes a time axis 902, a current axis 904, and a first ripple current 906a (e.g., associated with the first inductor L1), and a second ripple current 906b (e.g., associated with second inductor L2). The ripple currents 906a-b are shifted by 180° such that when they are combined together at the output, the resulting ripple to the battery B1 is reduced significantly. As a result, for WEVC applications, the output filter 508 can be designed rather small if only the standard 80-90 kHz filtering is considered. In addition, each of the first and second inductors L1, L2 loads the resonant circuit in different half periods. The AC ripple at the operating frequency (e.g. 80-90 kHz) can be a significant loss drivers for this type of receiver. The AC current also reflects an impedance back into the resonant tank which can lead to detuning of the tank resonance.

In an example, the interleaved power flow controller stage 506 appears to be a boost converter from a circuit diagram perspective, however, functionally it is more similar to a buck converter. A function of the interleaved power flow controller stage 506 is to fix the input voltage (i.e., $V_{VP}$) when the output voltage (i.e., $V_{BAT}$) changes by adjusting the duty cycle of the switches MN1, MN2. The interleaved power flow controller stage 506 and the control circuit 408 may be a switch mode controller configured to control the power that flows from the resonant tank to the battery B1. The interleaved power flow controller stage 506 is coupled to the current doubler circuit 504 as shown in FIG. 5. Each transistor (e.g., switch) MN1, MN2 of the interleaved power flow controller stage 506 acts on the current of one of the current doubler inductors L1, L2. The control signals (i.e., ctrl 1, ctrl 2) for the two switches MN1, MN2 are interleaved (e.g., phase shifted by 180 degrees). In combination with the current doubler circuit 504, each of the two switches MN1, MN2 operates at half of the battery current (e.g., output current). The switching of the transistor switches MN1, MN2 is synchronized (e.g., aligned) to the VP voltage in order to attain improved power flow.

Figure 10:
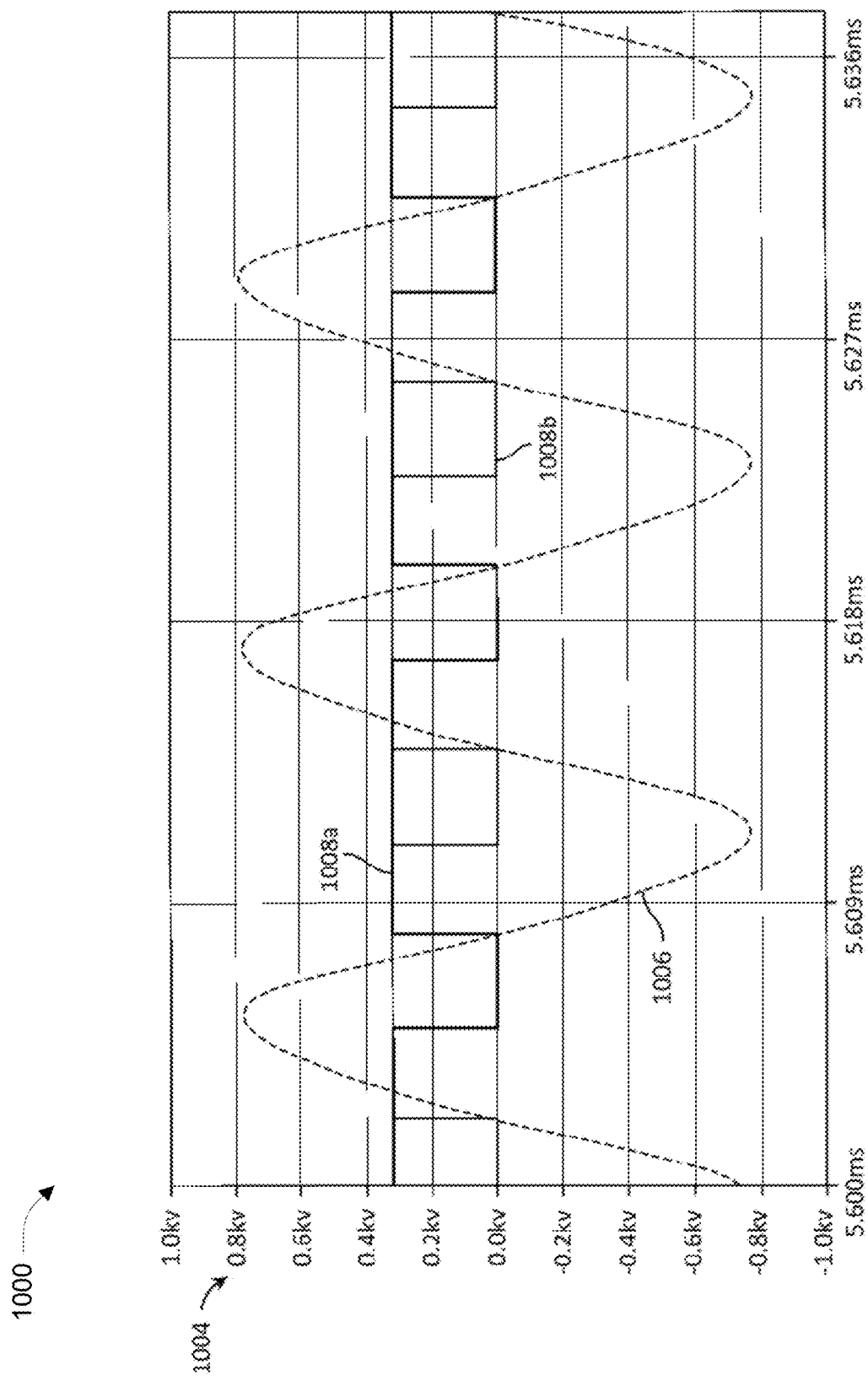
FIG. 10 is a graph of an example of power flow operation.

Referring to FIG. 10, a graph 1000 of an example of power flow stage operation is shown. The graph 1000 includes a time axis 1002, a voltage axis 1004, a VP voltage signal 1006, a first drain to source voltage 1008a, and a second drain to source voltage 1008b. The graph 1000 shows the VP voltage signal 1006 (e.g., $V_{VP}$) and the drain to source voltages 1008a-b of the two switches MN1, MN2 (e.g., the first drain to source voltage 1008a is ctrl1, and second drain to source voltage 1008b is ctrl2). The switching of the switches MN1, MN2 can be in principle synchronized to any point on the VP voltage signal 1006 waveform. While the synchronization of the switches MN1, MN2 is discussed in the context of VP voltage signal, the synchronization could be based on the corresponding current signal in the VP. As will be discussed, the switching synchronisation point (e.g., in relation to $V_{VP}$) influences the ripple current through the DC inductor (e.g., L1, L2) due to changes in the voltage to which the current doubler inductors are exposed. The two main synchronization points are depicted in FIG. 7B as the positive zero voltage crossing (ZVC) point 730 and the negative zero voltage crossing (ZVC) point 732. That is, the point where the voltage crosses from negative to positive values ($T_s$ in FIG. 7B) is called the Positive ZVC. The point where the voltage crosses from positive to negative values ($T_s/2$ in FIG. 7B) is called the Negative ZVC. The switching frequency of MN1, MN2 is synchronised in such a way that a switch turns-off in the ZVC point and turns-on in the time instant ZVC point −D, where D is the duty cycle. This means if the switching is synchronized to the Positive ZVC the switching occurs during the negative half waveform of the VP voltage (if D<50%). Furthermore, if the switching is synchronized to the Negative ZVC, the switching occurs during the positive half waveform of the VP voltage (if D<50%). The same will apply if MN1, MN2 are synchronized such that a switch turns-on in the ZVC point and turns-off in the time instant ZVC point −D.

Referring to FIGS. 11A and 11B, schematic diagrams of a circuit with positive zero voltage crossover point synchronization are shown. To assist with the explanation of the current flow through the system, the circuit diagrams in FIGS. 11A and 11B are simplified by hiding one current doubler inductor (e.g., L2) and related semiconductors (e.g., MN2, D4). All the discussions that follow are valid for the other inductor and related circuitry where the only difference is that there is reversed polarity of the VP voltage. The output current flowing into the battery is the sum of the two inductor currents. In an example, the operating period begins with the first switch MN1 turning-off and VP voltage rising into positive values (e.g., the positive ZVC point 730). The first interval lasts from t=0 until t=Ts/2 (see FIG. 7B). During this interval, the current flows similarly as shown in FIG. 8A (e.g., without the switch MN1) since the first switch MN1 is OFF during the entire interval. As indicated in FIG. 7B, this interval can be subdivided into first, second and third intervals 728a, 728b, 728c. During the first and third intervals 728a, 728c, $V_{VP}<V_{Bat}$ and the energy delivered to the output is a combination of the energy supplied by the DC inductor L1 (e.g., inductor current decreases) and the resonant circuit (e.g., VP and C1). During the second interval 728b, the inductor stores L1 the energy (inductor current increases) at the rate defined by the voltage difference between the VP voltage and battery voltage $V_{VP}-V_{Bat}$. The first switch MN1 is OFF to start the negative half period of the VP voltage (e.g., $T_s/2-T_s$). The main current flow is shown in FIG. 11A. The energy previously stored in the DC inductor L1 is used to supply the load. As soon as the switch MN1 turns-on, the freewheeling of inductor current begins (i.e., the energy stored in the inductor creates current). The current flow during this interval is shown in FIG. 11B. The DC inductor current remains constant if the component losses are neglected. The freewheeling interval ends when the switch MN1 turns-off. This action also starts the next period. The inductor current ripple in case of synchronisation to Positive ZVC is strongly dependent on the switch duty cycle D. This is primarily due to the presence of the freewheeling interval during which the inductor current does not change. Since the rate of current change during the other intervals is not dependent on the duty cycle, overall current ripple is inversely proportional to the duty cycle.

Figure 12A:
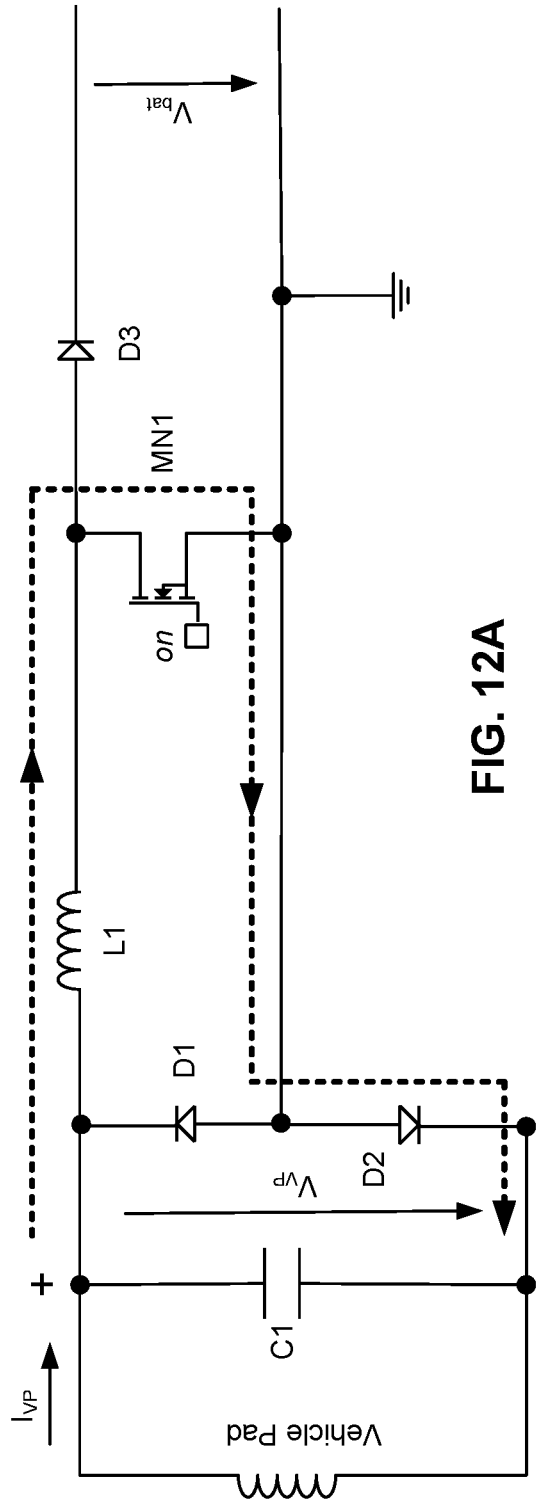
FIGS. 12A and 12B are simplified schematic diagrams of a circuit with negative zero voltage crossover point synchronization.
Figure 12B:
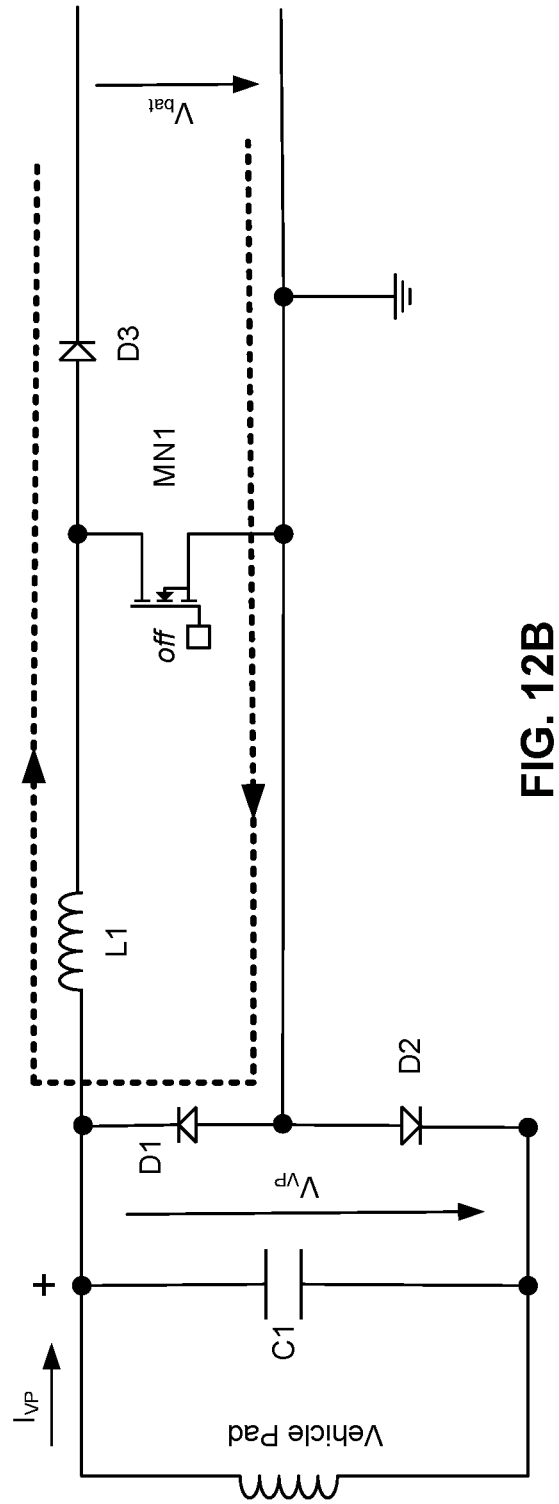

Referring to FIGS. 12A and 12B, schematic diagrams of a circuit with negative zero voltage crossover point synchronization are shown. To assist with the explanation of the current flow through the system, the circuit diagrams in FIGS. 12A and 12B are simplified by hiding one current doubler inductor (e.g., L2) and related semiconductors (e.g., MN2, D4). All the discussions that follow are valid for the other inductor and related circuitry where the only difference is that there is reversed polarity of the VP voltage. When the first switch MN1 turns-on during the positive half period of the VP voltage (i.e., when $V_{VP}<V_{Bat}$), the number of intervals that must be considered increases significantly. This increases the complexity and provides little added value for understanding the practical operation of the system. From the practical point of view, the duty cycle varies from zero to approximately 0.3-0.4. This means that the switch MN1 does not turn-on in the interval between $T_s/2-t_1$ and $T_s/2$. Freewheeling does not occur while operating with synchronisation to a Negative ZVC point 732. Therefore, the current flow paths and consequently the current ripple for the Negative ZVC are substantially different than an operation synchronised to Positive ZVC point. For example, an operating period in this case begins with the VP voltage rising into positive values. However, in this case, the switch MN1 is in its OFF state during the entire previous period. The first interval lasts from t=0 until the switch MN1 turns-on. During this interval, the current flows are similar to those as shown in FIG. 8A. This interval may be subdivided into two sub-intervals. During the first sub-interval, $V_{VP}<V_{Bat}$ and the energy delivered to the output is a combination of the energy supplied by the DC inductor L1 (e.g., inductor current decreases) and the resonant circuit (e.g., VP and C1). During the second sub-interval, the inductor stores the energy (e.g., inductor current increases) at the rate defined by the voltage difference between the VP voltage and battery voltage $V_{VP}-V_{Bat}$. The current flow during both sub-intervals is similar as shown in FIG. 8A. As soon as the switch MN1 turns-on, the second interval starts. The inductor L1 continues to store energy. The rate at which this occurs (i.e., the rate of current increase), however, increases due to the inductor L1 being exposed to the full VP voltage $V_{VP}$ and not only to the difference between the VP voltage and the battery voltage $V_{VP}-V_{Bat}$ as it was during the previous interval. The current flow in this interval is shown in FIG. 12A. The switch MN1 turns-off at the Negative ZVC point 732. The current flow during the entire negative period of VP voltage is shown in FIG. 12B. The inductor L1 supplies its energy to the output during this entire interval and therefore its current decreases. This interval ends in Positive ZVC point 730 when the next operating period begins.

Referring to FIG. 13A, a graph of simulated waveforms for positive zero voltage crossover point synchronization is shown. The graph includes a duty cycle wave form 1302a, a battery voltage value 1304a, a VP voltage value 1306a, and a DC inductor current value 1308a. The duty cycle wave form 1302a indicates different duty cycles for the switch MN1. For example, the values for the duty cycle (D) include 0, 10, 20, 30, 40, and 49 percent. The battery voltage value 1304a remains relatively constant through the cycle. The 0% duty cycle is aligned with the positive ZVC in the VP voltage value 1306a. The DC inductor current value 1308a with Positive ZVC synchronization is dependent on the switch duty cycle D. This is primarily due to the presence of the freewheeling interval during which the inductor current does not change. Since the rate of current change during the other intervals is not dependent on the duty cycle, overall current ripple is inversely proportional to the duty cycle. For example, each line of the VP voltage value 1306a and the DC inductor current value 1308a corresponds to a duty cycle value. The higher the duty cycle value, the smaller the DC inductor current value 1308a. The graph assumes constant power output and battery voltage.

Referring to FIG. 13B, a graph of simulated waveforms for negative zero voltage crossover point synchronization is shown. The graph includes a duty cycle wave form 1302b, a battery voltage value 1304b, a VP voltage value 1306b, and a DC inductor current value 1308b. The duty cycle wave form 1302b indicates different duty cycles for the switch MN1. For example, the values for the duty cycle (D) include 0, 10, 20, 30, and 40 percent. The battery voltage value 1304b remains relatively constant through the cycle. The 0% duty cycle is aligned with the negative ZVC in the VP voltage value 1306b. In contrast to Positive ZVC synchronization, the current ripple in Negative ZVC synchronization remains essentially constant. That is, as indicated in FIG. 13B, the DC inductor current value 1308b remains approximately the same for each duty cycle value. This result indicates that the inductor losses, reactive power injected into the resonant tank and related detuning as well as output current ripple are independent from the duty cycle D. Also, all of the parameters remain close to the maximum values for a particular battery voltage.

Figure 14A:
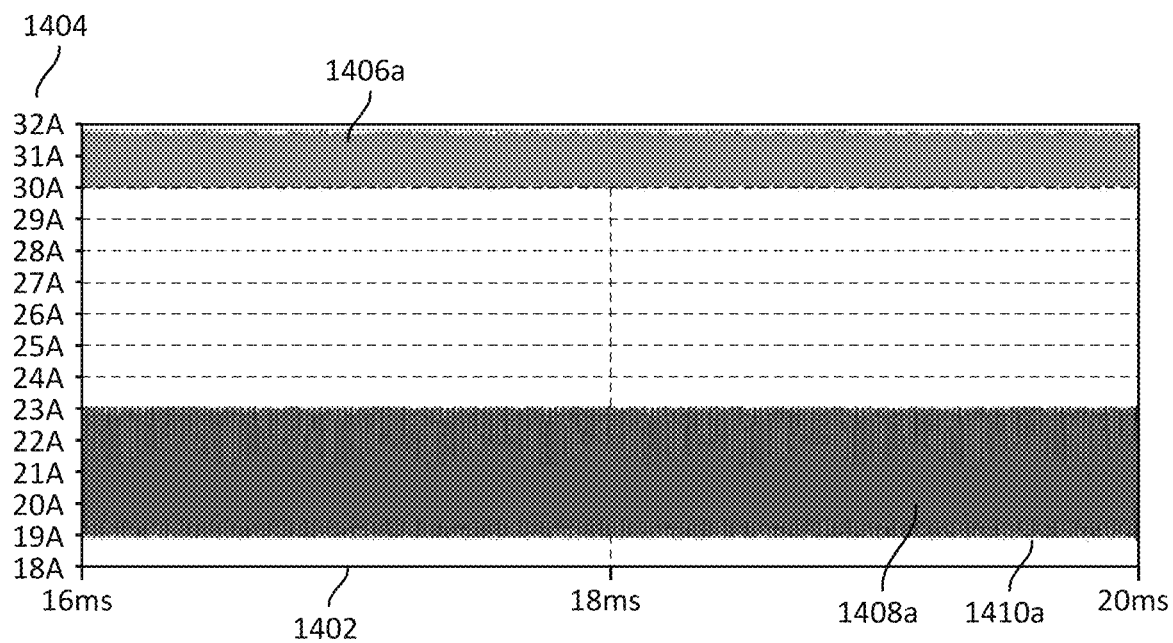
FIGS. 14A and 14B are graphs of output and inductor currents with and without synchronization.
Figure 14B:
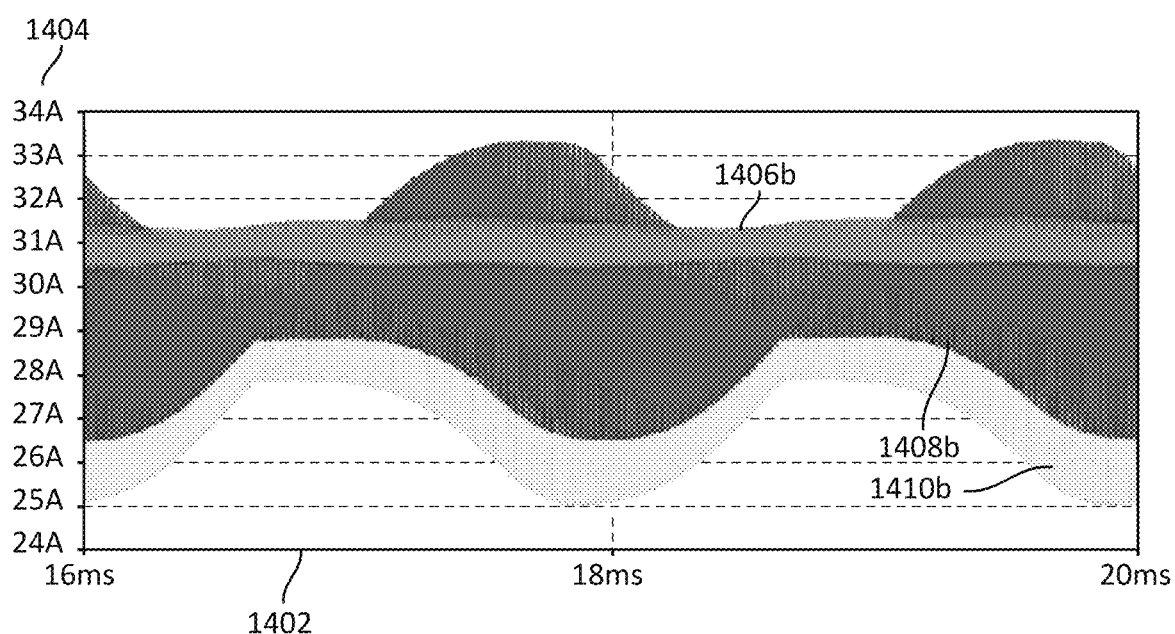

Referring to FIGS. 14A and 14B, graphs of output and inductor currents with and without synchronization are shown. The graphs include a time axis 1402 and a current axis (Amps) 1404. FIG. 14A illustrates the operation of the receiver 500 when the transistor switches MN1, MN2 are synchronized to the VP voltage (i.e., the voltage across the vehicle pad coil VP ($V_{VP}$ in FIG. 5)), and FIG. 14B illustrates an example when the transistor switches MN1, MN2 are not synchronized to the VP voltage. Both graphs depict an approximately constant output value 1406a, 1406b around 31 amps (e.g., +/−1 amp). In the synchronized system in FIG. 14A, a first inductor current value 1408a and a second inductor current value 1410a indicate an approximately constant current ripple of 4 A peak-to-peak, and approximate inductor current values of 21 A. In contrast, the graph without synchronization depicted in FIG. 14B indicates that the inductor current ripple varies from approximately 3.5 A to 8 A peak-to-peak, and the current through the inductors is increased to approximately 30 A (i.e., over a 9 amp increase as compared to the synchronized circuit). The level of inductor current variation in graph 14B (1408b, 1410b) is suboptimal and may lead to unstable operation. Further, the higher inductor current may also require the use of a larger inductor, or larger semiconductors to handle such diverse operating conditions.

Figure 15:
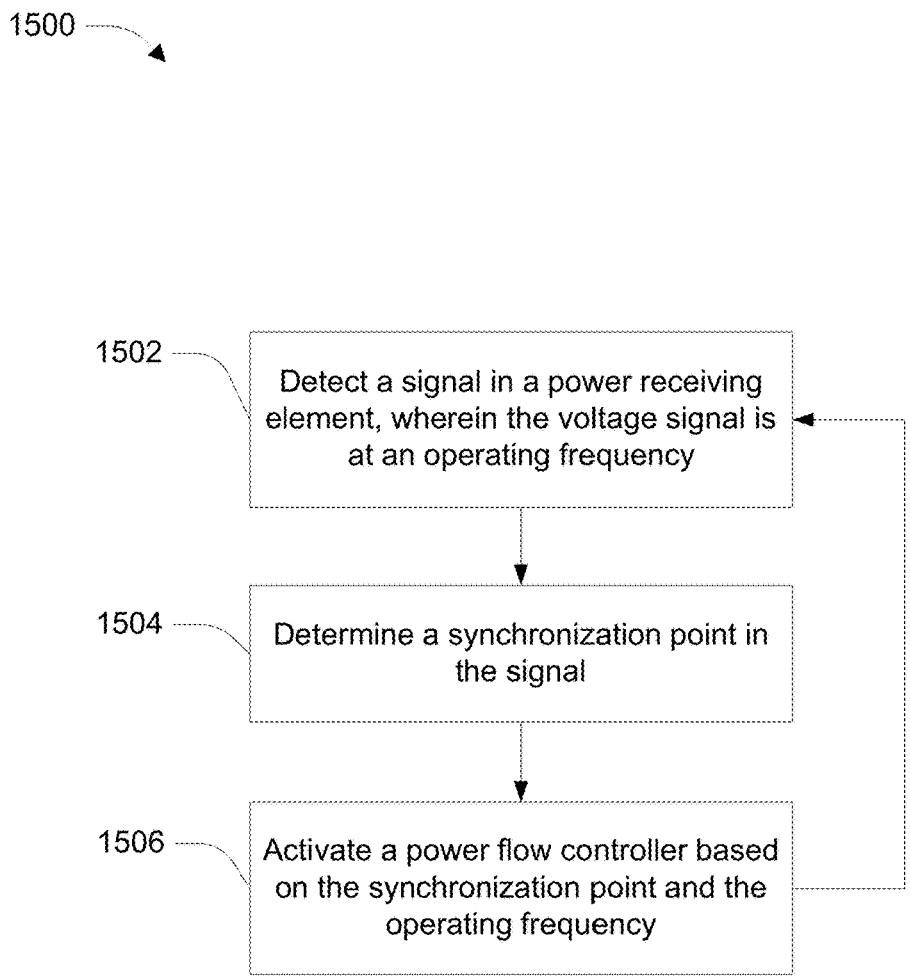
FIG. 15 is a flowchart of a process for controlling a receiver in a wireless power transfer system.

Referring to FIG. 15, an example of a process 1500 for controlling a receiver in a wireless power transfer system is shown. The process 1500 is, however, an example only and not limiting. The process 1500 can be altered, e.g., by having stages added, removed, rearranged, combined, performed concurrently, and/or having single stages split into multiple stages. Other alterations to the process 1500 as shown and described are also possible.

At stage 1502, a controller 250 detects a signal in a power receiving element 218, wherein the signal is at an operating frequency. The signal may be a voltage or corresponding current signal. In the WECV example, the operating frequency may be approximately 85 kHz (e.g., +/−5 kHz). Other applications, such as medical devices, may have other operating frequencies such as 6.2 MHz, 16 MHz, etc. The precise frequencies are only examples as the process 1500 contemplates transmitting systems with various operating frequencies such as when a transmitter is out of calibration. In general, a wireless power transfer system must react to transmitter variations, alignment and battery voltage variations, as well as other component tolerances that may impact the tuning of the receiver. In the WEVC example, referring to FIGS. 7A and 7B, the receiving element is the vehicle pad VP and the signal is the VP voltage value 724 (or the corresponding current value).

At stage 1504, the controller 250 determines a synchronization point in the signal (e.g., voltage waveform at the receive coil). In theory, the synchronization point may be at any point in the signal. In operation, it is generally easier to determine the Positive or Negative ZVC points. In the WEVC example, the signal is the VP voltage value 724 and the Positive and Negative ZVC points 730,732 may be used as the synchronization points. The selection of the synchronization point will impact the inductor current ripple in the receiver 500. For example, as depicted in FIG. 13A, the Positive ZVC may significantly reduce ripple current at higher duty cycles. In an embodiment, the correlation between the synchronization point and the impact on ripple current may be used to tune the receiver 500. For example, since the different synchronization points result in different current ripple, and a corresponding difference in reactive power being injected into the resonant tank, the reactive power injection can be controlled within certain limits which may be used for active system tuning. In either case, the selection of the synchronization point and the subsequent synchronization with the signal improves the stability of the receiver 500 and may reduce stress on the transmitter (e.g., on the inverter).

At stage 1506, the controller 250 activates a power flow controller stage 506 based on the synchronization point and the operating frequency. In the WEVC example, the switches MN1, MN2 in the power flow controller stage 506 may be configured to switch at the operating frequency of the power transfer (e.g., as received at the vehicle pad). Referring to FIGS. 13A and 13B, examples of Positive ZVC and Negative ZVC are shown. The 0% point in the respective duty cycle wave forms 1302a-b indicate the ZVC for each example. This 0% point remains synchronized with the signal (e.g., the respective VP voltage values 1306a-b). The pulses in the duty cycle wave forms 1302a-b may then then expand from the 0% point based on the duty cycle. The controller 250 may be configured to detect the signal at stage 1502 and modify the synchronization as appropriate.

In an example, the power flow controller may also be configured to adjust the duty cycle based on an inductance value in the power receiving element. In an example, the inductance value of a power receiving element may change based on the alignment between a vehicle pad and a base pad. Such an inductance variation may cause the tuning and current doubler circuit 504 to be detuned. The tuning may be improved by increasing the duty cycle in the power flow controller. The controller may detect the inductance variation (e.g., by comparing voltage and current phase in the L1) and then increase or decrease the switching duty cycle until the voltage and current measurement approximately in phase (e.g., +/−10%).

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. An apparatus for receiving power in a wireless power transfer system, comprising:
    a power receiving element;
    a tuning and current doubler circuit operably coupled to the power receiving element wherein the tuning and current doubler circuit includes at least one capacitor, at least two diodes and at least two inductors;
    a power flow controller circuit including a first transistor device and a second transistor device each operably coupled to the tuning and current doubler circuit; and
    a controller operably coupled to the power receiving element and the power flow controller circuit and configured to detect a signal in the power receiving element and to synchronize the power flow controller circuit based on the signal.

2. The apparatus of claim 1 wherein the controller is configured to synchronize the power flow controller circuit based on a negative zero crossover point in the signal.

3. The apparatus of claim 1 wherein the controller is configured to synchronize the power flow controller circuit based on a positive zero crossover point in the signal.

4. The apparatus of claim 1 further comprising a power output operably coupled to the power flow controller circuit.

5. The apparatus of claim 4 wherein the power output includes a battery.

6. The apparatus of claim 1 wherein the signal in the power receiving element is a voltage signal in the power receiving element.

7. The apparatus of claim 6 wherein a frequency of the voltage signal is in a range of 80 to 90 kHz.

8. The apparatus of claim 1 wherein the controller is configured to determine a duty cycle of the power flow controller circuit.

9. The apparatus of claim 8 wherein the duty cycle is based on inductor current value in the tuning and current doubler circuit.

10. The apparatus of claim 1 wherein the signal is a current signal in the power receiving element.

11. The apparatus of claim 1 wherein the power receiving element receives power via an inductive coupling with a transmitter.

12. A method of controlling a receiver in a wireless power transfer system, comprising:
    detecting a signal in a power receiving element, wherein the signal is at an operating frequency;
    determining a synchronization point in the signal;
    activating a first transistor device and a second transistor device in a power flow controller based on the synchronization point and the operating frequency; and
    wherein a tuning and current doubler circuit is operably coupled to the power receiving element and includes at least one capacitor, at least two diodes and at least two inductors.

13. The method of claim 12 wherein determining the synchronization point includes determining a negative zero voltage crossing point in the signal.

14. The method of claim 12 wherein determining the synchronization point includes determining a positive zero voltage crossing point in the signal.

15. The method of claim 12 further comprising:
    determining a power receiving element inductance value;
    determining a power flow controller duty cycle based on the power receiving element inductance value; and
    activating the first transistor device and the second transistor device in the power flow controller based at least in part on the power flow controller duty cycle.

16. The method of claim 12 wherein activating the first transistor device and the second transistor device in the power flow controller includes controlling a drain to source voltage in the first transistor device and the second transistor device based on the synchronization point and the operating frequency.

17. The method of claim 12 wherein the signal is a voltage signal in the power receiving element.

18. The method of claim 12 further comprising:
    determining an electrical current output to a battery, wherein the battery is operably coupled to the power flow controller via an output filter;
    determining a power flow controller duty cycle based on the electrical current output; and
    activating the first transistor device and the second transistor device in the power flow controller based at least in part on the power flow controller duty cycle.

19. The method of claim 18 wherein the power flow controller duty cycle is between 0% and 50%.

20. A non-transitory processor-readable storage medium comprising instructions for controlling a receiver in a wireless power transfer, comprising:
    code for detecting a signal in a power receiving element, wherein the signal is at an operating frequency;
    code for determining a synchronization point in the signal;
    code for activating a first transistor device and a second transistor device in a power flow controller based on the synchronization point and the operating frequency, and
    wherein a tuning and current doubler circuit is operably coupled to the power receiving element and includes at least one capacitor, at least two diodes and at least two inductors.

21. An apparatus for receiving power in a wireless power transfer, comprising:
    a power receiving means for receiving an electromagnetic field;
    a tuning and current doubler means for increasing output current operably coupled to the power receiving means, wherein the tuning and current doubler means includes at least one capacitor, at least two diodes and at least two inductors;
    a power flow controller means for controlling current flows in the apparatus, the power flow controller means including a first transistor device and a second transistor device each operably coupled to the tuning and current doubler means; and
    a controller means operably coupled to the power receiving means and the power flow controller means and configured for detecting a signal in the power receiving means and for synchronizing the power flow controller means based on the signal.

22. The apparatus of claim 21 wherein the controller means is configured to synchronize the power flow controller means based on a negative zero crossover point in the signal.

23. The apparatus of claim 21 wherein the controller means is configured to synchronize the power flow controller means based on a positive zero crossover point in the signal.

24. The apparatus of claim 21 wherein the controller means is configured to determine a duty cycle of the power flow controller means.

25. The apparatus of claim 24 wherein the controller means is configured to determine the duty cycle based on an inductance value of the power receiving means.

26. The apparatus of claim 21 further comprising a power output means operably coupled to the power flow controller means.

27. The apparatus of claim 21 wherein the signal is a current signal.

* * * * *